Sept. 17, 1963   E. ENK ET AL   3,104,158
PROCESS FOR MAKING CALCIUM OXIDE SUITABLE FOR
MANUFACTURING CALCIUM CARBIDE
Filed Feb. 13, 1961
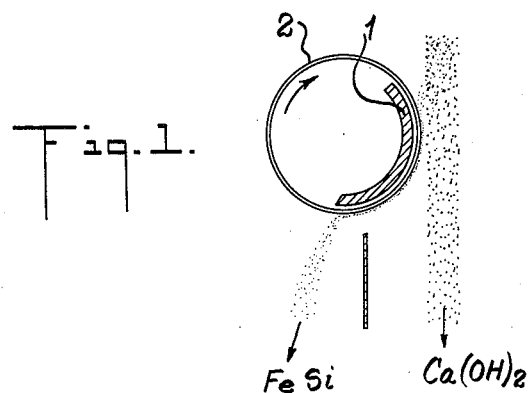
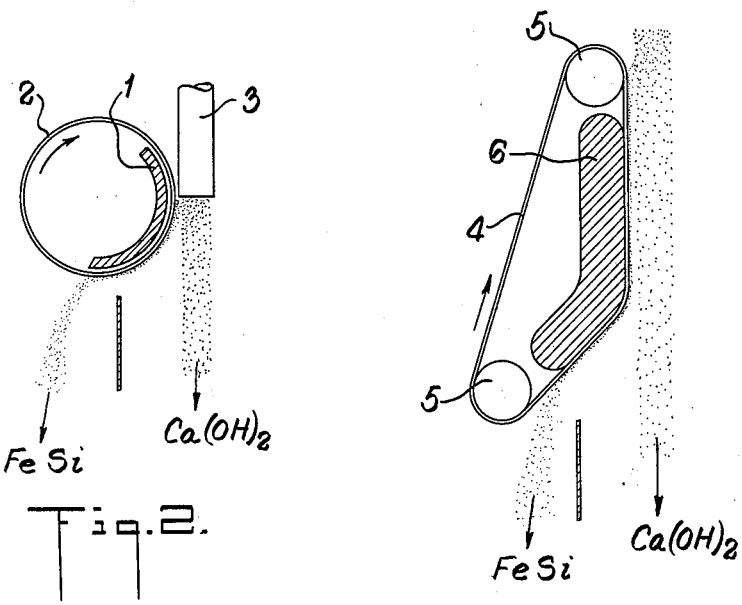
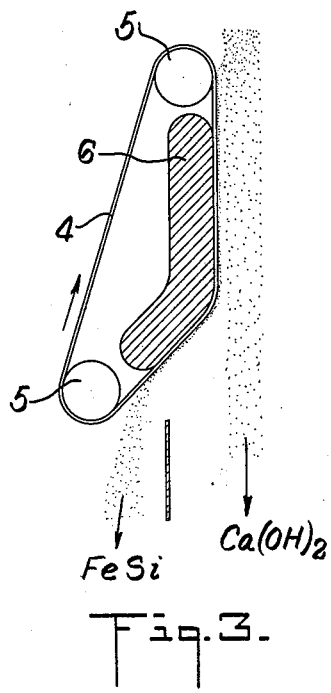
INVENTORS
EDUARD ENK
WOLFGANG LEICHER
BY WALTER SCHINDELIN
ATTORNEY 3,104,158
PROCESS FOR MAKING CALCIUM OXIDE SUITABLE FOR MANUFACTURING CALCIUM CARBIDE
Eduard Enk, Wolfgang Leicher, and Walter Schindelin, Burghausen, Upper Bavaria, Germany, assignors to Wacker-Chemie G.m.b.H., Munich, Bavaria, Germany, a corporation of Germany
Filed Feb. 13, 1961, Ser. No. 88,783
Claims priority, application Germany Feb. 20, 1960
1 Claim. (Cl. 23—186)

This invention relates to making calcium oxide suitable for use in the manufacture of calcium carbide, and it has for its object to provide a novel and improved process for this purpose.

Another object of the invention is to reduce the overall cost of making acetylene from calcium carbide by utilizing the calcium hydroxide by-product which has heretofore represented an economic loss.

Still another object is to treat the above-mentioned calcium hydroxide by-product in such a way that it may be utilized in the production of calcium carbide without introducing any difficulties in the operation of the conventional kilns.

Various other objects and advantages will be apparent as the nature of the invention is more fully disclosed.

In making acetylene from calcium carbide large quantities of calcium hydroxide are obtained in the form of slurry or powder as a by-product which can be sold only under favorable circumstances as lime for construction or fertilizing purposes. In most cases a more or less large part of such calcium hydroxide must be disposed of as waste. Hence there have been numerous experiments designed to return the calcium hydroxide to the carbide process. For this purpose it may be formed or molded and thus inserted into the carbide furnace. But in most cases it is burned again into calcium oxide by dehydrating it at temperatures above 550° C. in the form of a powder, briquettes or granules in shaft kilns or revolving tubular kilns.

It is difficult to obtain a calcium oxide suitable for making calcium carbide by burning calcium hydroxide. At low burning temperatures one obtains a white lime which is highly reactive. During transportation and storage it decomposes due to mechanical strain and the influence of moisture, developing large quantities of dust, and this causes difficulties and losses in kiln operation. If an attempt is made to burn and sinter at higher temperatures, the formation of large sinter blocks can be avoided only by carefully observing special exact process precautions. This formation of blocks makes special kiln construction necessary, and even then awkward difficulties will arise.

The decisive cause of the formation of blocks of the type mentioned is the presence of iron in free or combined form in the lime. This iron comes partly from impurities in the fresh lime and in the carbon or coal, and partly from the iron electrode casings and tapping rods, and it gets into the calcium carbide where it appears as metallic iron or as low-percentage ferro-silicon and goes through the carbide gasification process without any change. During the burning of the calcium hydroxide it combines with lime into ferrites and silicates which cause a very marked lowering of the melting temperature and thus also the dreaded blocking of the kiln.

Various methods have been tried for removing the iron and ferro-silicon in the above situation. In the case of liquid suspensions, the iron and ferro-silicon are separated hydraulically on the basis of their greater specific weights. In the case of calcium hydroxide powder too, the difference in specific weight can be utilized, for instance in air-current sifters. But in both cases it is difficult to completely remove the iron and ferro-silicon, which are present in fine form, without at the same time removing large quantities of calcium hydroxide.

It is also known to remove iron and the low percentage ferro-silicon from the calcium hydroxide with the aid of conventional magnetic separators. However, the calcium hydroxide powder obtained during carbide gasification has the annoying property of easily clotting and sticking together. On the one hand this leads to troublesome deposits on machine parts, such as rotary magnetic drums or magnetic tapes. On the other hand, while the larger pieces of iron and ferro-silicon can be separated magnetically from this clotted powder, the small particles can be removed only by very strong magnetic fields and these particles are then surrounded by calcium hydroxide to such an extent that the losses of lime increase considerably.

We have now discovered that a smooth and effective separation, in the situation described above, can be made by means of magnets if the calcium hydroxide powder is made to fall freely through a magnetic field. Thus the powder remains in such loose condition that the larger as well as the smaller particles of iron and ferro-silicon can be removed while the calcium hydroxide powder falls below without forming lining deposits on machine parts, thus making continuous operation possible.

In carrying out the process of the invention the calcium hydroxide, if it is not already in the form of a powder, is first thoroughly pulverized in any suitable manner. Next, the calcium hydroxide powder is caused to fall freely from a height, preferably in a thin stream, directly (vertically) into a collecting bin below. For example, in a plant in which the ceiling may be about a dozen feet high, the calcium hydroxide powder may pass from a storage bin on one floor onto a downwardly inclined smooth chute which may be a foot wide, from which the powder will drop through an opening in the floor into a collecting bin on the floor below. The powder thus drops, not in a thick raging torrent, but in a steady thin stream which is substantially vertical and therefore readily falls into a reduced opening or hopper on the top of the collecting bin.

In the specific example given above, a magnetic field is created by arranging suitable magnets such as electromagnets adjacent, but spaced from, the vertical path of the freely falling calcium hydroxide powder. One or more such magnets may be mounted in the space between the ceiling and the floor containing the collecting bin. This, as well as the strength of the magnetic field or fields, will depend upon the circumstances. Furthermore, the magnetic separation may be performed in two or more stages by causing the contents of one collecting bin to pass downwardly by gravity through another stage of magnetic separation.

In any such case the magnetic field, through which the freely falling calcium hydroxide powder descends, deflects the magnetic impurities from the descending stream so that said magnetic impurities fall on the floor instead of falling into the opening or hopper on the top of the collecting bin. Instead of allowing the magnetic impurities to fall all over the floor, downwardly sloping wooden baffle plates may be mounted below the magnetic field, just beyond the path of the descending stream, to direct the deflected magnetic impurities into a waste receptacle.

The calcium hydroxide thus purified can be burned and sintered at higher temperatures than heretofore without clotting into large blocks. This greatly facilitates kiln operation because it becomes more even, and small variations in operating conditions, such as the amount and distribution of coal, draft conditions, etc., can no longer have much influence on the operation.

In the accompanying drawing, FIGS. 1, 2 and 3 illustrate, diagrammatically, three arrangements of apparatus suitable for carrying out the invention.

FIG. 1 shows a magnetic element 1 with a rotating jacket or drum 2. The calcium hydroxide begins its free fall from a point adjacent the top of drum 2, and the magnet and drum are so positioned that the falling stream does not touch the drum. The magnetic particles pulled out of the descending stream impinge on the rotating drum 2 and are carried around by it until they pass out of the magnetic field, at which time they drop off into a suitable collector.

In FIG. 2 the calcium hydroxide descends through an enclosed conduit 3 which terminates adjacent the center of drum 2, from which point the stream falls freely as described in connection with FIG. 1.

FIG. 3 shows a magnetic band separator in which a continuous band or belt 4 rotates upon rollers 5 around a magnet or magnets 6. The magnetic particles drawn out of the free-falling stream of calcium hydroxide are pressed against the travelling belt 4 and fall off, into a separate collector, when they pass beyond the magnetic field.

*Example 1*

The appended table illustrates the advantages of the invention, where calcium hydroxide, purified as herein disclosed, is dehydrated to calcium oxide in a shaft kiln, as compared with the untreated (unpurified) calcium hydroxide of the prior art under similar conditions.

Batches of calcium hydroxide (treated according to the present invention, and untreated) in the form of cylindrical briquettes are burned by use of an anthracite mixed fire in a shaft kiln. The discharged calcium oxide gives the following comparison picture:

| Coal rate, percent | Burning temp., °C. | Discharge | |
|---|---|---|---|
| | | Untreated Ca(OH)$_2$ | Treated Ca(OH)$_2$ |
| 5.5 | 800 | Soft white lime, 30% sintered. | soft white lime, 30% sintered. |
| 6.0 | 900 | white lime, 60% sintered, small blocks. | white lime, 60% sintered, no blocks. |
| 6.5 | 1,100 | 80% sintered, large blocks. | 80% sintered, no blocks. |
| 7 | 1,300 | 100% sintered, large blocks, kiln blocked. | 100% sintered, no blocks. |

These experiments show that when iron and ferro-silicon are removed before briquetting, no blocks are formed either at a coal rate of 6.5% or 7%, although the discharge is sintered into individual pieces.

*Example 2*

When calcium hydroxide, as it results from the dry gasification of calcium carbide, is made to fall upon a rotary magnetic drum, the latter is covered with a thick layer of hydrate within a short time and no ferro-silicon is separated off.

It is possible to remove the deposits on the rotary magnetic drum by using brushes and scrapers continuously. Thereby, however, together with the iron and ferro-silicon separated off, the five- to twenty-fold amount of hydrate is lost.

When approximately 1% iron is separated off, there results a total amount of waste of about 20% of the starting calcium hydroxide, that total amount of waste consisting of about 5% ferro-silicon and 95% calcium hydroxide.

If the calcium hydroxide however is made to fall freely past the drum, the latter remains clean, the separation effect is guaranteed and only a small amount of calcium hydroxide, adhering to the iron, is wasted. In this case, the amount of iron separation being the same as above i.e. 1%, the total loss is 2% of the starting amount, and consists of approximately 50% ferro-silicon and approximately 50% calcium hydroxide.

The invention claimed is:

Process for making calcium oxide suitable for use in the manufacture of calcium carbide, from calcium hydroxide which contains an appreciable amount of magnetic impurities, which comprises causing said calcium hydroxide in a loose powdered state to fall freely and substantially vertically through a magnetic field in the form of a thin stream from an elevated place into a lower collector, spaced from said magnetic field, having an entrance of limited size large enough to admit the descending stream, whereby said magnetic impurities are removed from said stream, and burning the purified calcium hydroxide to form the calcium oxide.

References Cited in the file of this patent
UNITED STATES PATENTS 2,474,207 Lovell et al. _____ June 28, 1949
2,548,780 Gary et al. _____ Apr. 10, 1951
2,631,941 Cole _____ Mar. 17, 1953

OTHER REFERENCES

Chemical Engineers' Handbook, J. H. Perry, 2nd ed., 2nd impression, 1941, pages 1730–32, McGraw-Hill Book Co., Inc. New York.